United States Patent
Huber

(10) Patent No.: US 7,293,414 B1
(45) Date of Patent: Nov. 13, 2007

(54) HIGH PERFORMANCE METHOD FOR THROTTLING OF CLOSED GAS TURBINE CYCLES

(75) Inventor: David J. Huber, Tequesta, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 375 days.

(21) Appl. No.: 11/055,155

(22) Filed: Feb. 10, 2005

(51) Int. Cl.
*F01K 25/02* (2006.01)

(52) U.S. Cl. .................................................. 60/682

(58) Field of Classification Search ............. 60/39.183, 60/39.511, 39.512, 682, 683, 684
See application file for complete search history.

(56) References Cited

U.S. PATENT DOCUMENTS

| | | | | |
|---|---|---|---|---|
| 3,321,930 A | * | 5/1967 | La Fleur | 62/228.4 |
| 4,148,191 A | * | 4/1979 | Frutschi | 60/682 |
| 4,228,659 A | * | 10/1980 | Lowther | 60/682 |

* cited by examiner

Primary Examiner—L. J. Casaregola
(74) Attorney, Agent, or Firm—Norman Friedland

(57) ABSTRACT

A closed cycle recuperator microturbine and an open cycle heat generating system for supplying heat for driving the turbine includes a pair of valves fluidly connected to the compressor inlet and compressor outlet for bleeding air therefrom when the microturbine engine is operating in the lower power operating envelope of the operating conditions of the microturbine engine while the open cycle heat generating system maintains the thermodynamic conditions of the microturbine engine operating substantially a constant value whereby the fuel consumption of the microturbine engine is enhanced during the low power conditions. The microturbine engine serves to power an electric generator and a ECU heater.

12 Claims, 2 Drawing Sheets

HIGH PERFORMANCE METHOD FOR THROTTLING OF CLOSED GAS TURBINE CYCLES

FEDERALLY SPONSORED RESEARCH

None

TECHNICAL FIELD

This invention relates to gas turbine engines and particularly to control of the closed gas turbine cycle so as to enhance engine efficiency where the engine operates at power levels significantly below maximum load for large portions of its operation.

BACKGROUND OF THE INVENTION

Gas turbines have difficulty competing with reciprocating internal combustion engines (i.e. gas and diesel engines) in applications where a large portion of the mission is spent at power levels significantly below maximum load, and where their inherent power density and emissions advantages are not substantially valued. This is due to the steep falloff in gas turbine thermal efficiency as power is reduced. This shortcoming has historically been addressed by the addition of a recuperator, which not only increases thermal efficiency at maximum load, but also reduces the efficiency lapse rate as load is reduced. In addition to the recuperator, variable power turbine inlet guide vanes are sometimes also included to further reduce the efficiency lapse.

Still even the recuperated gas turbine with variable power turbine inlet guide vanes realizes a severe thermal efficiency lapse when throttled from maximum load to low power settings. This is primarily the result of reductions in both cycle pressure ratio and turbine inlet temperature. The optimal throttling scheme typically consists of first shutting power turbine variable guide vane (VGV's), and then reducing turbine inlet temperature (TIT). Gas generator shaft speed is reduced during throttling, resulting in corresponding reductions in flow and pressure ratio (per the gas generator operating line). Reduction in turbomachinery efficiency as power is reduced further exacerbates the problem.

SUMMARY OF THE INVENTION

An object of this invention is to provide a throttling scheme for closed gas turbine cycles of a gas turbine engine where a large portion of the mission is spent at power levels significantly below maximum load.

A feature of this invention is to decouple the compressor inlet conditions from the atmosphere that is inherent in such systems to optimize inlet conditions and cycle parameters during part-load operation.

Another feature of this invention is to provide two control valves opening the closed gas path to the atmosphere. The effect is operation at near constant thermodynamic cycle and allowing most throttling via flow reduction, at constant gas generator speed.

This invention is characterized as being simple to implement and improves the low cycle fatigue of the engine's components.

The foregoing and other features of the present invention will become more apparent from the following description and accompanying drawings.

Figure 1:
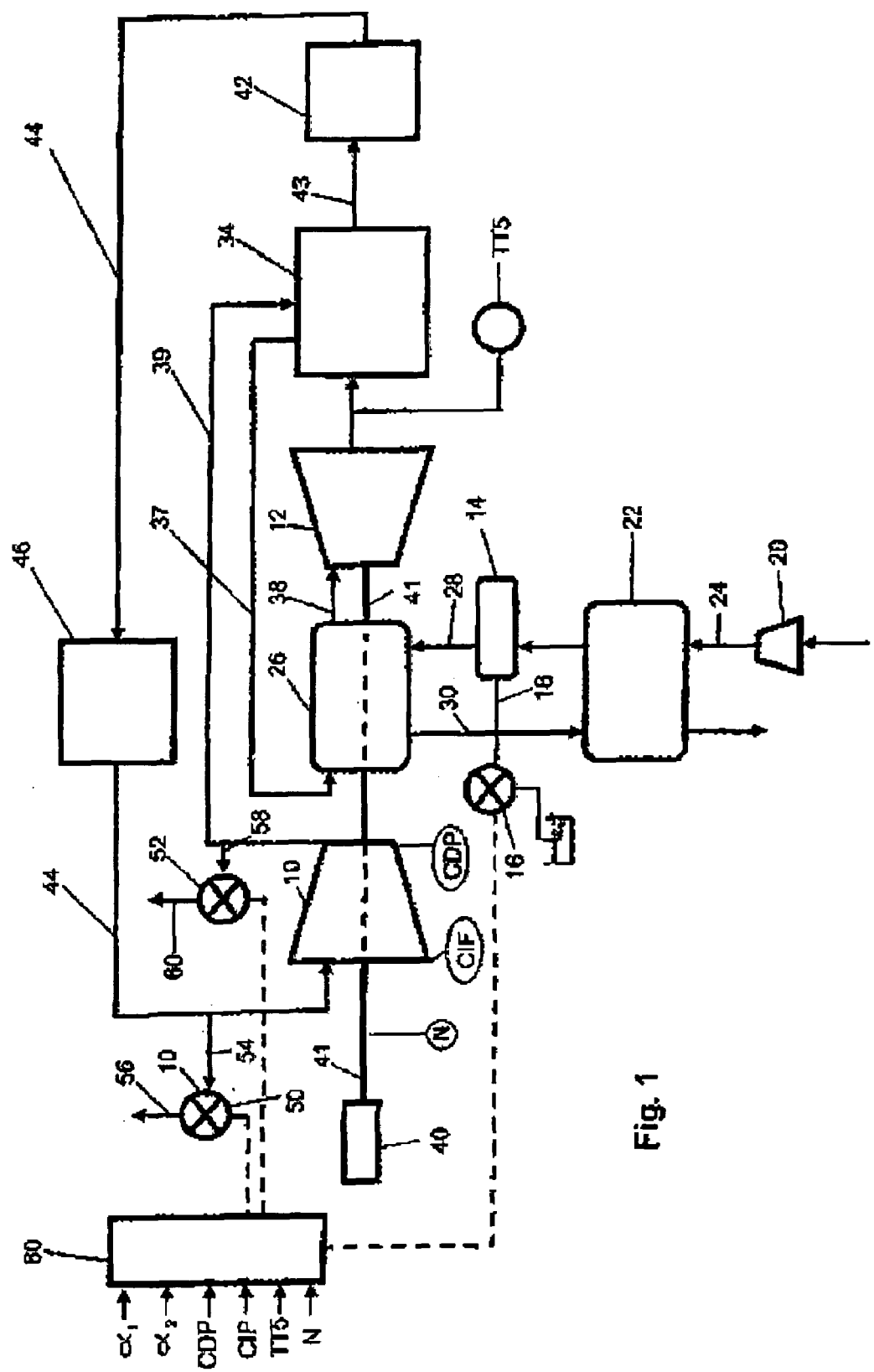
FIG. 1 is a schematic illustration of this invention.

The drawing merely serves to further clarify and illustrate the present invention and is not intended to limit the scope thereof.

DETAILED DESCRIPTION OF THE INVENTION

One of the advantages of a closed cycle is that it allows more flexibility in selecting a throttling scheme. This closed cycle operating scheme for an indirect-fired closed-cycle recuperated gas turbine takes advantage of this attribute, and results in nearly constant thermal efficiency from maximum load down to approximately 20-40% load. This results in a dramatic improvement in low-power thermal efficiency, and is an enabling technology for the competitiveness of such gas turbines in applications where the vast majority of mission time is spent at low power.

For such applications, full-load efficiency may be substantially below that of either a gas or diesel internal combustion engine, or an open-cycle turbine operating at high TIT, yet the importance of efficiency at low power levels results in a competitive mission-weighed fuel consumption. In these applications, comparison of maximum load thermal efficiencies is of dubious value, and the true measure of system performance is the mission-weighed fuel consumption, that takes into account the percentage of mission time spent in each power range. Since the vast majority of fuel is consumed at low power for the missions and applications of interest here, the result is a viable system.

The throttling scheme operates on the principal that, since the cycle is closed to the atmosphere, it is possible to decouple the compressor inlet conditions (i.e. pressure and temperature) from the ambient conditions and thereby customize them for optimal throttling. The method claimed involves two control valves that open the closed-cycle gas path to the atmosphere during transient operation. For all steady-state operation, both valves remain closed. One of these control valves is located on the suction side of the compressor (presumably near the compressor inlet), and contains its own dedicated air filter.

At full load the compressor inlet pressure is approximately equal to ambient pressure consistent with an open cycle. As with all steady-state operating points, both control valves are closed at full load. The throttling method claimed herein is applied to reduce load from full load by first opening the compressor discharge valve to bleed air from the closed cycle gas path to the atmosphere. When this valve is opened, the effective throttle area; For the compressor is increased and the compressor, which runs at constant speed, down matches in proportion to the valve size and degree of actuation.

Since gas generator shaft speed is constant, the compressor inlet corrected flow must also remain constant, and this is effected by a reduction in the compressor inlet pressure that manifests itself by reducing all pressures in the closed cycle by the same proportion. In the case of the indirect-fired closed cycle for which the claimed invention was originally developed, the indirect firing system is controlled such that the turbine inlet temperature (TIT) is maintained at its full-load value. Air is bled in this way from the closed loop system until the power output is reduced to the desired level, at which time the valve is shut and the compressor down match is eliminated.

Note that at reduced power levels, all the major cycle parameters are very close to their design full-load values. Compressor speed and pressure ratios, as well as turbine inlet temperature, are virtually unchanged, and the result is nearly constant thermal efficiency across a wide power range. Therefore, this throttling scheme maintains the full-load thermodynamic cycle while reducing power via reduced flow. In effect, the result is very close to the ideal 'rubber engine'.

This throttling approach can maintain near-constant thermodynamic cycle (and therefore thermal efficiency) down to a power level of approximately 20-40% of full-load for the system for which is was originally conceived. This limitation arises since the compressor discharge pressure eventually approaches ambient pressure. Near this condition, the compressor discharge control valve is closed, and the remaining throttling is accomplished via reduced TIT at constant shaft speed (IE. in the indirect-fired cycle, the indirect firing system is controlled to reduce TIT). It is of obvious value to extend the power level at which this transition occurs to as low a level as possible to maximize part-load efficiency. From a control standpoint, this can be accomplished by minimizing valve size and actuation to minimize the transient compressor down match, albeit at the cost of increased throttle response times. From a design perspective, the transition power level may be reduced by increasing design compressor pressure ratio.

To increase power from low power to full power, the TIT is first increased to the design full-load value, and the control valve in the compressor inlet is opened. Since the compressor inlet pressure is below ambient pressure during part-power operation, air is ingested into the closed-loop gas path until the compressor inlet pressure approaches ambient pressure and the cycle is at full load. Note, as with the compressor discharge valve, throttle response requirements will dictate valve sizing and actuation.

Note another potential benefit of the proposed throttling scheme is that low-cycle fatigue (LCF) should be reduced throughout the system, as operating temperatures fluctuate much less than in gas turbines throttled solely by TIT. This attribute may prove especially beneficial to the heat exchangers that will typically be present in such closed systems. Additionally, since the throttling scheme is accomplished at constant shaft speed, LCF of the turbo machinery should also be reduced.

While other embodiments can be utilized corresponding to variations in the engine cycle configuration for which the method clay be applied, the sole FIGURE illustrates the indirect-fired closed cycle. This cycle is a closed recuperated gas turbine, with the added features of indirect firing and heat rejection to a thermally-driven Environmental Control Unit (ECU) in addition to atmospheric heat rejection.

As one skilled in the art will appreciate the method for throttling closed gas turbine cycles could just as easily be applied for the case where either or both the recuperator and ECU are not present. In this case where neither is present, the engine cycle would be closed simple cycle, with heat rejection to the atmosphere or some other suitable low-temperature sink.

It is possible that such a scheme could also be applied to a direct—fired cycle, that is, a cycle with direct fuel W oxidant injection into the closed gas path upstream of the turbine expander. Such a system would have added systems for removal of the products of combustion, and/or perhaps compressor inlet and outlet control valve operating schemes whereby either or both valves are at least partially open during steady state operation, to both purge products of combustion as well as continually introduce oxidant into fine 'closed' gas path to ensure sufficient oxidant for combustion.

Also, the method requires only constant gas generator speed, and therefore may be applied to gas turbine system in either single or multi-shaft configurations.

Figure 2:
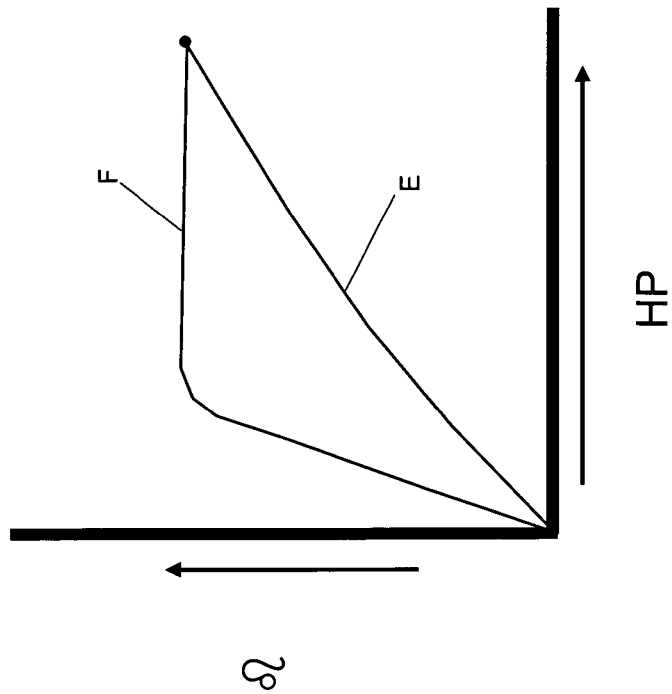
FIGS. 2 and 3 are graphs representing engine efficiencies.
Figure 3:
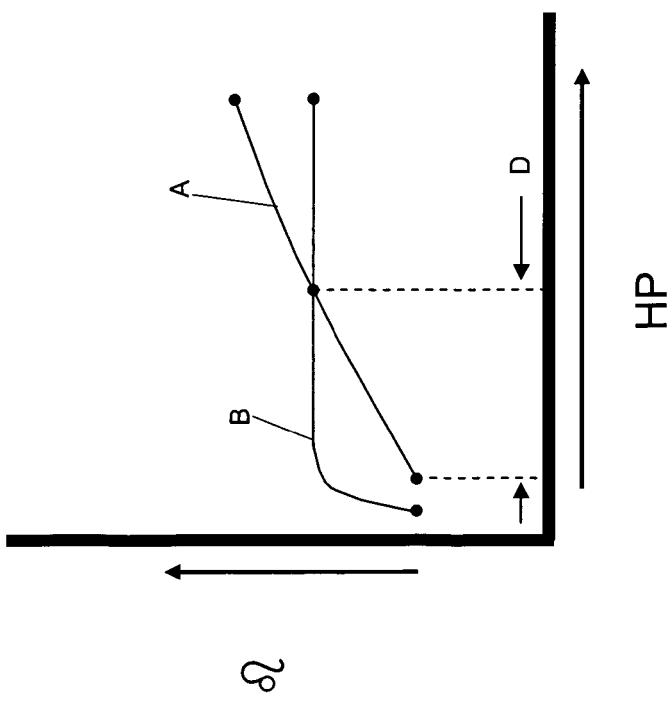

Another way to understand the nature of the invention is to refer to FIGS. 2 and 3 that graphically show the comparison of a diesel engine and the present invention (FIG. 2) and a comparison of a microturbine engine without the invention and with the invention (FIG. 3). As noted in FIG. 2 the line labeled A represents the operation of a diesel engine in a plot of efficiency ($\eta$) versus horsepower (HP) and the curve labeled B is the operation of the present invention. It will be noted that at point C the curves cross and the diesel engine becomes less efficient at the low horsepower range. Hence, the invention is designed to operate between the area of the curve designated D. The graph in FIG. 3 illustrate the operation of both the present invention and the microturbine engine without the present invention. As noted the operation of the microturbine engine shows a steep slope as indicated by curve E while the microturbine engine with the present invention operates at a higher efficiency over a larger portion of the horsepower range as illustrated by curve F.

The present invention is best understood by referring to FIG. 1 which shows a microturbine closed cycle recuperator engine having a compressor 10, turbine 12 and combustor 14. These components operate as a conventional gas turbine engine where air is supplied to the compressor that compresses the air prior to being admitted into the turbine 12 for generating power. In this system, the combustor 14 that is fueled by the throttle valve 16 that flows fuel into the combustor via line 18 and fuel throttle valve 19, be it liquid or gas, where the air and fuel are combined to form the engine working medium or gases. The fan which may be driven by a suitable electric motor (not shown) serves to continuously supply air to the combustor which is preheated by the combustion air recuperator 22. As shown, the air discharging from fan 20 is delivered to the combustion air recuperator 22 via line 24 which is indirect heat exchange with the gases used in the turbine inlet heater 26. The turbine inlet heater 26 receives the hot gases from the combustor 14 via line 28 and returns the spent heated gases to the combustion air recuperator 22 via the line 30. This portion of the system is a closed cycle since the heated gases generated by the combustor 14 is placed in indirect heat exchange with the compressor air in the turbine inlet heater 26 admitted thereto from line 28 and the discharged preheated gases are returned to the combustion air recuperator 22 via line 30.

As mentioned above, the microturbine engine which is a recuperator engine, is also a closed cycle as will be described herein below. Air admitted to turbine 12 via line 37 is preheated by the recuperator 34 which receives the air discharging from compressor 10 via line 39. The compressor discharge air in recuperator 34 is placed in indirect heat exchange with the turbine discharge air admitted thereto via connection 36. The preheated air is returned to the turbine inlet heater 26 and then admitted into the turbine via 38. The output of the microturbine serves to power the electric generator 40 and the ECU Heater unit 42. The engine rotating shaft 41 connected to the turbine/compressor drives a suitable electric generator and the spent air from the recuperator 34 flowing to the ECU/Heater 42 via line 43 provides the energy to power an air conditioning system and environmental control unit (not shown and all of which are not part of this invention). The discharge from the ECU Heater unit 42 is returned to the inlet of compressor 10 to repeat the cycle via the line 44 and the heat rejection box 46. The heat rejection via box 46 serves is to assure that the temperature of the gases being admitted to the compressor 10 is been reduced sufficiently to maintain efficient engine operation finalizing the closed loop cycle of the micro turbine system.

According to this invention a pair of valves 50 and 52 are operatively and fluidly connected to the compressor 10. Valve 50 serves to bleed air from the inlet of compressor 10 via lines 54 and 56 and valve 52 serves to bleed air from the discharge end of compressor 10 via lines 58 and 60. Both valves 50 and 52 bleed the air to ambient and typically are in the operative mode to change the flow in the micro turbine while the remaining portion of the system maintains a constant TIT. In other words the thermodynamic cycle is relatively unchanged while the flow through the engine at low power is regulated so as to operate in the area between lines D (FIG. 2).

Control of the microturbine engine may be achieved with a digital engine control generally illustrated as reference numeral 60 of the type that is typically utilized to control gas turbine engines that power aircraft. For the sake of convenience and simplicity the details of the control are omitted herefrom as this is well known technology. The control 60 which includes a microprocessor serves to receive the operating parameters and computes the values to operate the fan speed, the fuel flow to the combustor and the throttling of valves 50 and 52. The alpha $\alpha 1$ and a $\alpha 2$ are power lever inputs that control the fuel flow and fan speeds, respectively. As is typical in engine controls the parameters useful in controlling the engine are compressor discharge pressure (CDP), compressor inlet pressure (CIP), Turbine temperature (TT5), engine shaft speed (N) and the power lever inputs $\alpha 1$ and $\alpha 2$.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. In combination, a closed cycle recuperator microturbine having a turbine, compressor, and recuperator, and an opened cycle heat system including a combustor, fuel and a throttle valve for regulating the flow of fuel into the combustor and a fan and means for powering the fan for regulating the flow of ambient air to the combustor for combustion with the fuel, a turbine inlet heater for placing the combusted gases from the combustor in indirect heat exchange with the air discharging from the compressor for heating the air discharging from the compressor and for powering said turbine, said recuperator disposed downstream of said turbine for preheating the compressor discharge air prior to being admitted to said turbine, a first valve fluidly connecting ambient to the inlet of the compressor and a second valve for fluidly connecting ambient to the discharge of said compressor, control means connected to said first valve and said second valve for discharging air from the inlet of the compressor and the discharge of the compressor during low power condition of the operation of the closed cycle recuperator microturbine engine whereby the open cycle heat system maintains the thermodynamic conditions of said closed cycle recuperator microturbine.

2. In combination as claimed in claim 1 including an electric generator mechanically connected to said compressor and said turbine for generating electricity.

3. In combination as claimed in claim 2 including an ECU and Heater connected to said recuperator extracting energy from said turbine.

4. In combination as claimed in claim 3 including a heat rejection member disposed between said ECU Heater and said compressor for lowering the temperature of the discharge air from said ECU Heater prior to being admitted into said compressor for maintaining efficient operation of said closed cycle.

5. In combination as claimed in claim 1 wherein said control means is an electronic digital control.

6. In combination as claimed in claim 4 wherein said electronic digital control responds to the setting of said throttle valve and the speed of said fan.

7. In combination as claimed in claim 5 including sensing means for sensing the turbine temperature, the compressor inlet pressure and compressor discharge pressure for generating engine operating parameters, said electronic digital control responsive to said inlet operating parameters for computing an output signal for controlling the operation of said open cycle and said closed cycle.

8. A closed cycle recuperator microturbine in combination with an open cycled heat system, said closed cycle recuperator mircroturbine having a turbine, compressor, and recuperator, said opened cycle heat system including a combustor, fuel and a throttle valve for regulating the flow of fuel into the combustor and a fan and means for powering the fan for regulating the flow of ambient air to the combustor for combustion with the fuel, a turbine inlet heater for placing the combusted gases from the combustor in indirect heat exchange with the air discharging from the compressor for heating the air discharging from the compressor and for powering said turbine, said recuperator disposed downstream of said turbine for placing the discharge air from said compressor in indirect heat exchange with the discharge air from said turbine for preheating the compressor discharge air prior to being admitted to said turbine, a first valve fluidly connecting ambient to the inlet of the compressor and a second valve for fluidly connecting ambient to the discharge of said compressor, control means connected to said first valve and said second valve for discharging air from the inlet of the compressor and the discharge of the compressor during low power condition of the operation of the closed cycle recuperator microturbine engine whereby the open cycle heat system maintains the thermodynamic conditions of said closed cycle recuperator microturbine, said closed cycle recuperator microturbine supplying the energy to power an electric generator and ECU heater.

9. In combination as claimed in claim 8 including a heat rejection member disposed between said ECU Heater and said compressor for lowering the temperature of the discharge air from said ECU Heater prior to being admitted into said compressor for maintaining efficient operation of said closed cycle.

10. In combination as claimed in claim 8 wherein said control means is an electronic digital control.

11. In combination as claimed in claim 10 wherein said electronic digital control responds to the setting of said throttle valve and the speed of said fan.

12. In combination as claimed in claim 11 including sensing means for sensing the turbine temperature, the compressor inlet pressure and compressor discharge pressure for generating engine operating parameters, said electronic digital control responsive to said inlet operating parameters for computing an output signal for controlling the operation of said open cycle and said closed cycle.

* * * * *